(12) United States Patent
Song

(10) Patent No.: US 10,288,978 B2
(45) Date of Patent: May 14, 2019

(54) NAKED-EYE 3D LENS DISPLAY DEVICE AND METHOD FOR MANUFACTURING THE SAME

(71) Applicant: Shenzhen China Star Optoelectronics Technology Co., Ltd., Shenzhen, Guangdong (CN)

(72) Inventor: Jiangjiang Song, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 86 days.

(21) Appl. No.: 15/324,485

(22) PCT Filed: Aug. 18, 2016

(86) PCT No.: PCT/CN2016/095812
§ 371 (c)(1),
(2) Date: Nov. 1, 2017

(87) PCT Pub. No.: WO2018/018675
PCT Pub. Date: Feb. 1, 2018

(65) Prior Publication Data
US 2018/0180966 A1 Jun. 28, 2018

(30) Foreign Application Priority Data

Jul. 27, 2016 (CN) .......................... 2016 1 0600503

(51) Int. Cl.
*G02F 1/29* (2006.01)
*G02B 27/22* (2018.01)
*G02F 1/09* (2006.01)

(52) U.S. Cl.
CPC .............. *G02F 1/29* (2013.01); *G02B 27/22* (2013.01); *G02B 27/2214* (2013.01); *G02F 1/09* (2013.01)

(58) Field of Classification Search
CPC ....... G02B 27/22; G02B 27/2214; G02F 1/29; G02F 1/09
See application file for complete search history.

(56) References Cited

U.S. PATENT DOCUMENTS

2008/0227256 A1 9/2008 Tanimoto

FOREIGN PATENT DOCUMENTS

| CN | 102244099 A | 11/2011 |
|---|---|---|
| CN | 102315264 A | 1/2012 |

(Continued)

OTHER PUBLICATIONS

International Search Report dated Aug. 31, 2016 for International Patent Application No. PCT/CN2016/083450.
(Continued)

*Primary Examiner* — Joseph P Martinez

(57) ABSTRACT

A naked-eye 3D lens display device and a method for manufacturing the same are disclosed. The present disclosure relates to the technical field of 3D display, and particularly to a naked-eye 3D display technology. The technical problem that the lens of the display device in the prior art cannot be switched between 3D display mode and 2D display mode can be solved. The two electromagnetic shielding films are arranged facing each other. The frame and spacers are arranged between the two electromagnetic shielding films, and the frame and spacers and the two electromagnetic shielding films form a closed space. The electronically controlled magnetic poles are respectively arranged on two inner walls of the electromagnetic shielding films facing each other. The liquid medium is distributed in the closed space. The transparent magnetic particles are arranged in the liquid medium in the closed space. The display screen is fixed on an outer wall of either of the two electromagnetic shielding films. The beneficial effect lies in that, the naked-eye 3D lens can be switched between 3D (Continued)

display mode and 2D display mode. The 3D lens display device is light and thin, and has a good display effect and a low cost. The naked-eye 3D lens can be used in 3D display products.

8 Claims, 3 Drawing Sheets

(56) References Cited

FOREIGN PATENT DOCUMENTS

| | | | | |
|---|---|---|---|---|
| CN | 102376715 A | 3/2012 | | |
| CN | 102640044 A | 8/2012 | | |
| CN | 103558724 A | 2/2014 | | |
| CN | 103823307 A | 5/2014 | | |
| CN | 103926748 A | 7/2014 | | |
| CN | 104749825 A | 7/2015 | | |
| CN | 104966735 A | 10/2015 | | |
| CN | 105334645 | * | 2/2016 | ............... G02F 1/09 |
| CN | 105334645 A | 2/2016 | | |
| WO | 2011029409 A2 | 3/2011 | | |

OTHER PUBLICATIONS

Chinese Office Action dated Mar. 26, 2018 for Chinese Patent Application No. 201610600503.1.

* cited by examiner

NAKED-EYE 3D LENS DISPLAY DEVICE AND METHOD FOR MANUFACTURING THE SAME

CROSS REFERENCE TO RELATED APPLICATION

The present application claims priority of Chinese patent application CN201610600503.1, entitled "Naked-eye 3D Lens Display Device and Method for Manufacturing the Same" and filed on Jul. 27, 2016, the entirety of which is incorporated herein by reference.

FIELD OF THE INVENTION

The present disclosure relates to the technical field of three dimensional (3D) display, and particularly to a naked-eye 3D display technology.

BACKGROUND OF THE INVENTION

In recent years, with the popularity of intelligent display product and increasingly fierce market competition, three dimensional (3D) display technology has been developing rapidly and made great progress. The display product develops towards a light and thin trend, which draws great attention of technological researchers in 3D field. At the same time, with the revolution of display technology, the display technology is experiencing transition from two dimensional (2D) display mode to 3D display mode. Among 3D display technologies, a naked-eye 3D display technology has become a new development trend in the display field. The naked-eye 3D display technology is used in more and more display products. When human eyes see an actual object, since there is a slight difference between the distances of two eyes from the object, a 3D display effect can be shown. According to 3D display technology, when a photographed object is shown on a display equipment, the 3D display effect of the actual object can be achieved. In the naked-eye 3D display technology, the feature of slight difference between the distances of two eyes from the object is also used. That is, according to the naked-eye 3D display technology, a certain technical means is used so that the display equipment can show two images with different display effects to right eye and left eye respectively. Therefore, an audience does not need to wear an auxiliary device, and a lifelike 3D image can be obtained.

According to the naked-eye 3D display technology in the prior art, a substrate is coated with a sealant; a convex lens A2 is formed by a mould; and the convex lens A2 is fitted on a display screen A1 so as to form a naked-eye 3D lens. The disadvantage of this kind of 3D lens lies in that only a 3D display mode can be realized, while the 3D lens cannot be switched between the 3D display mode and the 2D display mode. Moreover, this kind of naked-eye 3D lens has a complicated production procedure, a high production cost, and a low intelligent degree, which would not facilitate the development of 3D display technology and the improvement of product quality.

SUMMARY OF THE INVENTION

In order to solve the aforesaid technical problem, the present disclosure provides a naked-eye 3D lens display device and a method for manufacturing the naked-eye 3D lens display device.

The naked-eye 3D lens display device comprises a display screen and a 3D lens, wherein the 3D lens comprises two electromagnetic shielding films, a plurality of electronically controlled magnetic poles, a frame and spacers, a liquid medium, and a. plurality of transparent magnetic particles. The two electromagnetic shielding films are arranged facing each other, and the plurality of electronically controlled magnetic poles are respectively arranged on two inner walls of the electromagnetic shielding films facing each other. The frame and spacers are arranged between the two electromagnetic shielding films, and the frame and spacers and the two electromagnetic shielding films form a closed space. The liquid medium is distributed in the closed space. The plurality of transparent magnetic particles are arranged in the liquid medium in the closed space. A 3D display mode is realized when the plurality of transparent magnetic particles are distributed in a curved shape, and a 2D display mode is realized when the plurality of transparent magnetic particles are distributed in a same direction uniformly. The display screen is fixed on an outer wall of either of the two electromagnetic shielding films.

Of the two electromagnetic shielding films, one electromagnetic shielding film has a thickness ranging from 0.1 mm to 0.3 mm, and the other electromagnetic shielding film has a thickness ranging from 0.1 mm to 0.3 mm. The two electromagnetic shielding films both have a light transmittance higher than 95%.

The transparent magnetic particles have a ball shape, and a diameter of the ball is in a range from 90 nm to 110 nm.

A height of the frame and spacers is in a range from 15 μm to 25 μm, and the height refers to a span of the frame and spacers in a direction perpendicular to the electromagnetic shielding films.

The frame and spacers and the two electromagnetic shielding films form a plurality of closed spaces.

The display screen is an OLED display screen.

The display screen is a liquid crystal display screen.

According to the present disclosure, the method for manufacturing the naked-eye 3D lens display device comprises steps of:

step 1, forming a plurality of electronically controlled magnetic poles on two electromagnetic shielding films respectively;

step 2, forming a frame and spacers on one electromagnetic shielding film containing the plurality of electronically controlled magnetic poles;

step 3, pouring a liquid medium containing a plurality of transparent magnetic particles into a frame;

step 4, assembling the frame and spacers with the other electromagnetic shielding film containing the plurality of electronically controlled magnetic poles, so that a 3D lens is manufactured; and step 5, assembling the 3D lens with a display screen.

According to the present disclosure, a strength of the electronically controlled magnetic poles can be controlled through controlling an electric current therein, so that a concave and convex magnetic field can be formed, and the plurality of transparent magnetic particles can be distributed in different modes along magnetic field lines in the liquid medium. The 3D display mode is realized when the plurality of transparent magnetic particles are distributed in a curved shape in the liquid medium, and the 2D display mode is realized when the plurality of transparent magnetic particles are distributed in a same direction uniformly in the liquid medium. Therefore, the beneficial effect of the present disclosure lies in that, the naked-eye 3D lens display device can be switched between the 3D display mode and the 2D display mode. Since the electromagnetic shielding films are used, an influence of external magnetic field on the electronically controlled magnetic poles can be eliminated. The two electromagnetic shielding films both have a light transmittance higher than 95%, and thus the naked-eye 3D lens can have a good display effect. Each electromagnetic shielding film has a thickness ranging from 0.1 mm to 0.3 mm, and the height of the frame and spacers is in a range from 15 μm to 25 μm. Therefore, the naked-eye 3D lens display device is light and thin, and has a low cost and a high intelligent degree, which would facilitate the development of 3D display.

The naked-eye 3D lens according to the present disclosure can be used in 3D display products.

The above technical features can be combined in any suitable manner, or substituted by the equivalent technical features, as long as the purpose of the present disclosure can be achieved.

BRIEF DESCRIPTION OF THE DRAWINGS

The present disclosure will be illustrated in detail hereinafter with reference to the embodiments and the accompanying drawings. In the drawings.

Figure 1:
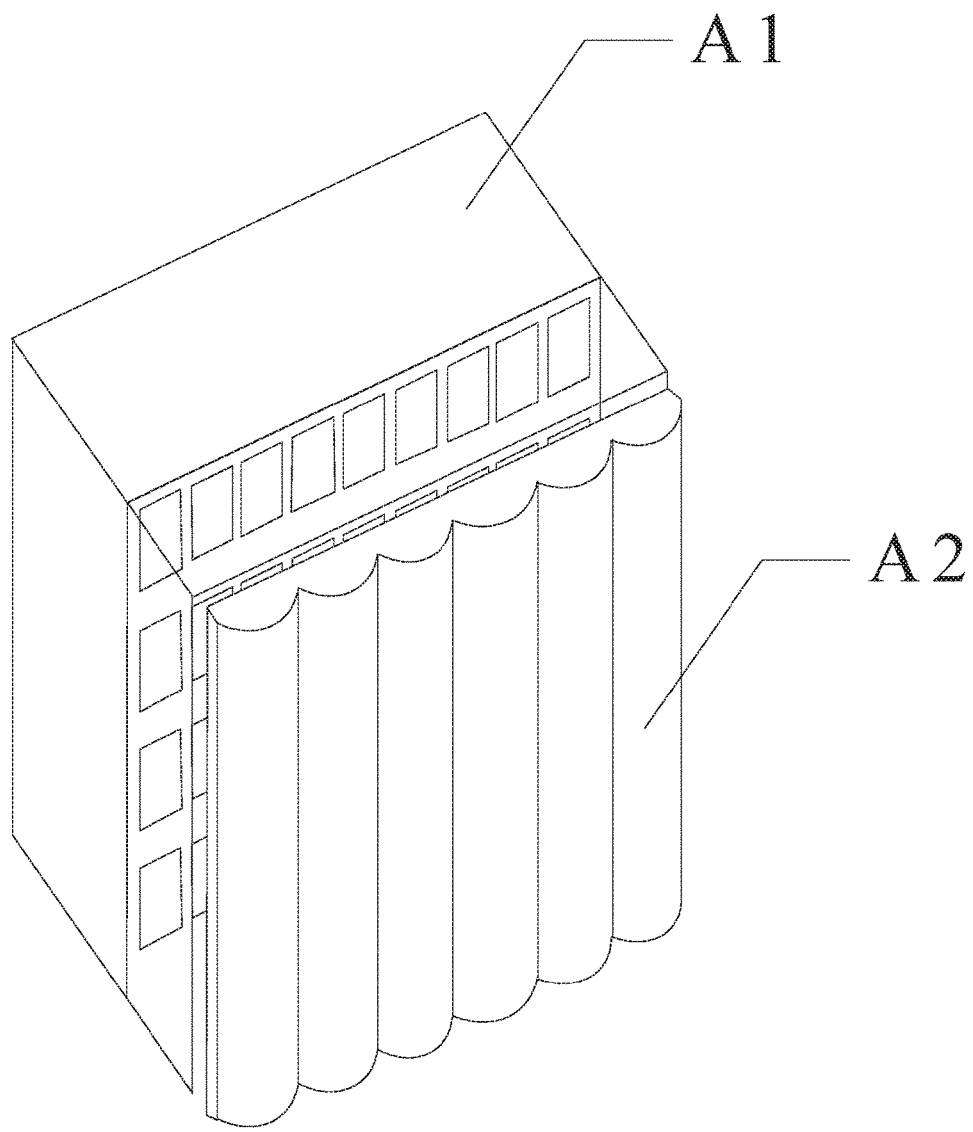
FIG. 1 schematically shows a structure of a naked-eye 3D lens in the prior art, wherein A1 is a display screen, and A2 is a lens.

In the drawings, the same components are represented by the same reference signs, and the size of each component does not represent the actual size of the corresponding component.

DETAILED DESCRIPTION OF THE EMBODIMENTS

The present disclosure will be illustrated further with reference to the drawings.

Embodiment 1

Figure 2:
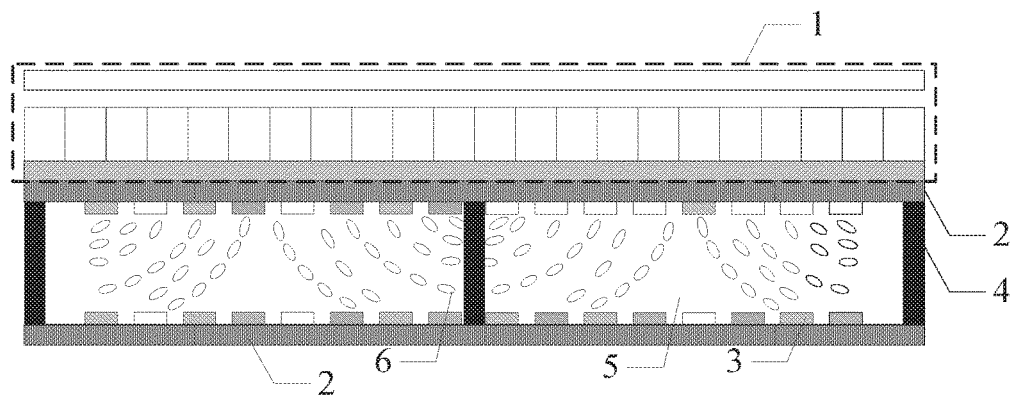
FIG. 2 schematically shows a structure of a naked-eye 3D lens display device according to embodiment 1.
Figure 3:
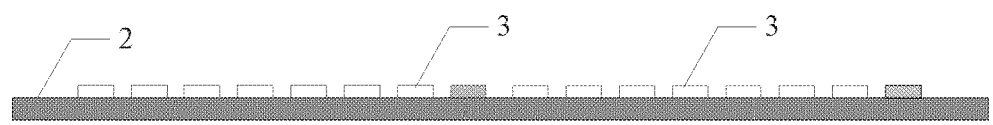
FIG. 3 schematically shows a structure when a plurality of electronically controlled magnetic poles are formed on one electromagnetic shielding film according to embodiment 4 or embodiment 5.
Figure 4:
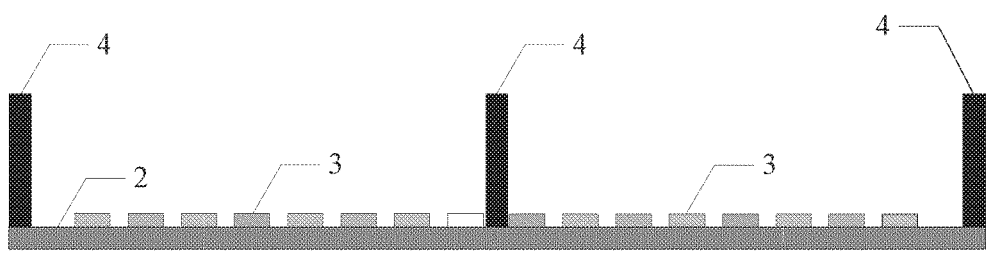
FIG. 4 schematically shows a structure when a frame and spacers are formed on the electromagnetic shielding film containing the plurality of electronically controlled magnetic poles according to embodiment 4 or embodiment 5.
Figure 5:
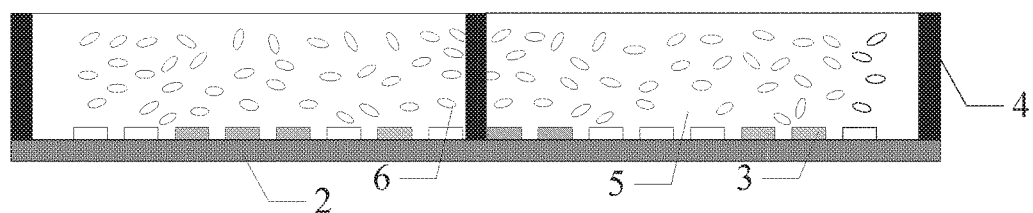
FIG. 5 schematically shows a structure when a liquid medium containing a plurality of transparent magnetic particles is poured into a frame according to embodiment 4 or embodiment 5.
Figure 6:
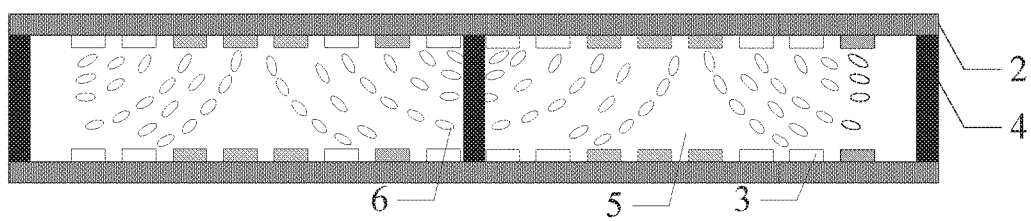
FIG. 6 schematically shows a structure when the two electromagnetic shielding films containing the plurality of electronically controlled magnetic poles are assembled with each other according to embodiment 4 or embodiment 5.

The present embodiment will be illustrated below with reference to FIG. 2. According to the present embodiment, a naked-eye 3D lens display device comprises a display screen 1 and a 3D lens.

The 3D lens comprises two electromagnetic shielding films 2, a plurality of electronically controlled magnetic poles 3, a frame and spacers 4, a liquid medium 5, and a plurality of transparent magnetic particles 6.

The two electromagnetic shielding films 2 are arranged facing each other and are used for eliminating an influence of external magnetic field on a magnetic field formed by the electronically controlled magnetic poles 3.

The plurality of electronically controlled magnetic poles 3 are respectively arranged on two inner walls of the electromagnetic shielding films 2 facing each other. The plurality of electronically controlled magnetic poles 3 are used for forming a magnetic field so as to control a distribution mode of the plurality of transparent magnetic particles 6 in the liquid medium 5.

The frame and spacers 4 are arranged between the two electromagnetic shielding films 2, and the frame and spacers 4 and the two electromagnetic shielding films 2 form a closed space. The frame and spacers 4 are used for limiting flow of the liquid medium 5.

The liquid medium 5 is distributed in the closed space. The plurality of transparent magnetic particles 6 are arranged in the liquid medium 5 in the closed space.

The display screen 1 is fixed on an outer wall of either of the two electromagnetic shielding films 2.

According to the present embodiment, the two electromagnetic shielding films 2 both have a thickness of 0.2 mm. The transparent magnetic particles 6 have a ball shape, and a diameter of the ball is 100 nm. The transparent magnetic particles 6 are made of $SiO_2$, Fe, B, or Nd. A height of the frame and spacers 4 is 20 μm, and the height refers to a span of the frame and spacers 4 in a direction perpendicular to the electromagnetic shielding films. The display screen 1 is an OLED display screen.

Embodiment 2

According to the present embodiment, a naked-eye 3D lens display device comprises a display screen 1 and a 3D lens.

The 3D lens comprises two electromagnetic shielding films 2, a plurality of electronically controlled magnetic poles 3, a frame and spacers 4, a liquid medium 5, and a plurality of transparent magnetic particles 6.

The two electromagnetic shielding films 2 are arranged facing each other and are used for eliminating an influence of external magnetic field on a magnetic field formed by the electronically controlled magnetic poles 3.

The plurality of electronically controlled magnetic poles 3 are respectively arranged on two inner walls of the electromagnetic shielding films 2 facing each other. The plurality of electronically controlled magnetic poles 3 are used for forming a magnetic field so as to control a distribution mode of the plurality of transparent magnetic particles 6 in the liquid medium 5.

The frame and spacers 4 are arranged between the two electromagnetic shielding films 2, and the frame and spacers 4 and the two electromagnetic shielding films 2 form a closed space. The frame and spacers 4 are used for limiting flow of the liquid medium 5.

The liquid medium 5 is distributed in the closed space. The plurality of transparent magnetic particles 6 are arranged in the liquid medium 5 in the closed space.

The display screen 1 is fixed on an outer wall of either of the two electromagnetic shielding films 2.

According to the present embodiment, the two electromagnetic shielding films 2 both have a thickness of 0.2 mm. The transparent magnetic particles 6 have a ball shape, and a diameter of the ball is 100 nm. The transparent magnetic particles 6 are made of $SiO_2$, Fe, B, or Nd. A height of the frame and spacers 4 is 20 μm, and the height refers to a span of the frame and spacers 4 in a direction perpendicular to the electromagnetic shielding films. The display screen 1 is a liquid crystal display screen.

Embodiment 3

According to the present embodiment, a naked-eye 3D lens display device comprises a display screen 1 and a 3D lens.

The 3D lens comprises two electromagnetic shielding films 2, a plurality of electronically controlled magnetic poles 3, a frame and spacers 4, a liquid medium 5, and a plurality of transparent magnetic particles 6.

The two electromagnetic shielding films 2 are arranged facing each other and are used for eliminating an influence of external magnetic field on a magnetic field formed by the electronically controlled magnetic poles 3.

The plurality of electronically controlled magnetic poles 3 are respectively arranged on two inner walls of the electromagnetic shielding films 2 facing each other. The plurality of electronically controlled magnetic poles 3 are used for forming a magnetic field so as to control a distribution mode of the plurality of transparent magnetic particles 6 in the liquid medium 5.

The frame and spacers 4 are arranged between the two electromagnetic shielding films 2, and the frame and spacers 4 and the two electromagnetic shielding films 2 form a closed space. The frame and spacers 4 are used for limiting flow of the liquid medium 5.

The liquid medium 5 is distributed in the closed space. The plurality of transparent magnetic particles 6 are arranged in the liquid medium 5 in the closed space.

The display screen 1 is fixed on an outer wall of either of the two electromagnetic shielding films 2.

According to the present embodiment, the two electromagnetic shielding films 2 both have a thickness of 0.2 mm. The transparent magnetic particles 6 have an elliptical ball shape, and a long axis of the elliptical ball is 100 nm. The transparent magnetic particles 6 are made of $SiO_2$, Fe, B, or Nd. A height of the frame and spacers 4 is 20 μm, and the height refers to a span of the frame and spacers 4 in a direction perpendicular to the electromagnetic shielding films.

Embodiment 4

The present embodiment will be illustrated below with reference to FIGS. 3 to 6. The present embodiment provides a method for manufacturing a naked-eye 3D lens display device according to embodiment 1 or embodiment 2.

First, one electromagnetic shielding film 2 with a thickness of 0.2 mm is placed on a horizontal plane, and a plurality of electronically controlled magnetic poles 3 are formed on an upper surface of the electromagnetic shielding film 2. Similarly, the other electromagnetic shielding film 2 with a thickness of 0.2 mm is placed on a horizontal plane, and a plurality of electronically controlled magnetic poles 3 are formed on an upper surface of the electromagnetic shielding film 2. It is required that the two electromagnetic shielding films 2 both have a light transmittance higher than 95%, so that the final display effect will not be affected.

Then, a frame and spacers 4 are formed on one electromagnetic shielding film 2 containing the plurality of electronically controlled magnetic poles 3. The frame and spacers 4 comprise a frame and a plurality of spacers. The frame is arranged at four edges of the electromagnetic shielding film 2. A height of the frame is 20 μm, and the height refers to a span of the frame and spacers 4 in a direction perpendicular to the electromagnetic shielding film 2. The frame is used for limiting flow of a liquid medium 5. The plurality of spacers are arranged inside the four edges of the electromagnetic shielding film 2. The plurality of spacers all have a height of 20 μm, and are used for controlling a distance between two electromagnetic shielding films 2.

Next, a liquid medium 5 containing a plurality of transparent magnetic particles 6 is poured into a frame. In order to ensure that the final display effect will not be affected, the liquid medium 5 is made of a liquid insulation material with a light transmittance higher than 95%. The transparent magnetic particles 6 have a ball shape, and a diameter of the ball is 100 nm. The transparent magnetic particles 6 are made of $SiO_2$, B, or Nd.

After that, the frame and spacers 4 are assembled with the other electromagnetic shielding film 2 containing the plurality of electronically controlled magnetic poles 3. The other electromagnetic shielding film 2 containing the plurality of electronically controlled magnetic poles 3 in the horizontal plane is assembled with the frame and spacers 4 in which the liquid medium 5 containing the plurality of transparent magnetic particles 6 is poured. In this manner, it can be ensured that the electronically controlled magnetic poles 3 are positioned inside the liquid medium 5. The two electromagnetic shielding films 2 and the frame and spacers 4 form a plurality of closed spaces, and the liquid medium 5 containing the plurality of transparent magnetic particles 6 is fully filled in the closed spaces. At this time, a 3D lens is manufactured. The two electromagnetic shielding films 2 are used for eliminating an influence of external magnetic field on a magnetic field formed by the electronically controlled magnetic poles 3.

At last, the 3D lens is assembled with a display screen 1. A glass substrate of the display screen 1 is fixed on an outer wall of either of the two electromagnetic shielding films 2.

Embodiment 5

The present embodiment will be illustrated below with reference to FIGS. 3 to 6. The present embodiment provides a method for manufacturing a naked-eye 3D lens display device according to embodiment 1 or embodiment 2.

First, one electromagnetic shielding film 2 with a thickness of 0.2 mm is placed on a horizontal plane, and a plurality of electronically controlled magnetic poles 3 are formed on an upper surface of the electromagnetic shielding film 2. Similarly, the other electromagnetic shielding film 2 with a thickness of 0.2 mm is placed on a horizontal plane, and a plurality of electronically controlled magnetic poles 3 are formed on an upper surface of the electromagnetic shielding film 2. It is required that the two electromagnetic shielding films 2 both have a light transmittance higher than 95%, so that the final display effect will not be affected.

Then, a frame and spacers 4 are formed on one electromagnetic shielding film 2 containing the plurality of electronically controlled magnetic poles 3. The frame and spacers 4 comprise a frame and a plurality of spacers. The frame is arranged at four edges of the electromagnetic shielding film 2. A height of the frame is 20 μm, and the height refers to a span of the frame and spacers 4 in a direction perpendicular to the electromagnetic shielding film 2. The frame is used for limiting flow of a liquid medium 5. The plurality of spacers are arranged inside the four edges of the electromagnetic shielding film 2. The plurality of spacers all have a height of 20 μm, and are used for controlling a distance between two electromagnetic shielding films 2.

Next, a liquid medium 5 containing a plurality of transparent magnetic particles 6 is poured into a frame. In order to ensure that the final display effect will not be affected, the liquid medium 5 is made of a liquid insulation material with a light transmittance higher than 95%. The transparent magnetic particles 6 have an elliptical ball shape, and a long axis of the elliptical ball is 100 nm. The transparent magnetic particles 6 are made of SiO2, Fe, B, or Nd.

After that, the frame and spacers 4 are assembled with the other electromagnetic shielding film 2 containing the plurality of electronically controlled magnetic poles 3. The other electromagnetic shielding film 2 containing the plurality of electronically controlled magnetic poles 3 in the horizontal plane is assembled with the frame and spacers 4 in which the liquid medium 5 containing the plurality of transparent magnetic particles 6 is poured. In this manner, it can be ensured that the electronically controlled magnetic poles 3 are positioned inside the liquid medium 5. The two electromagnetic shielding films 2 and the frame and spacers 4 form a plurality of closed spaces, and the liquid medium 5 containing the plurality of transparent magnetic particles 6 is fully filled in the closed spaces. At this time, a 3D lens is manufactured. The two electromagnetic shielding films 2 are used for eliminating an influence of external magnetic field on a magnetic field formed by the electronically controlled magnetic poles 3.

At last, the 3D lens is assembled with a display screen 1. A glass substrate of the display screen 1 is fixed on an outer wall of either of the two electromagnetic shielding films 2.

The present disclosure is illustrated hereinabove with reference to the specific embodiments, which are only examples of the principle and use of the present disclosure. Those skilled in the art can make amendments to the embodiments disclosed herein or provide other arrangements without departing from the spirit and scope of the present disclosure. The technical feature described in one embodiment can also be used in other embodiments.

The invention claimed is:

1. A naked-eye 3D lens display device, comprising a display screen (1) and a 3D lens, wherein the 3D lens comprises two electromagnetic shielding films (2), a plurality of electronically controlled magnetic poles (3), a frame and spacers (4), a liquid medium (5), and a plurality of transparent magnetic particles (6);
    wherein the two electromagnetic shielding films (2) are arranged facing each other, and the plurality of electronically controlled magnetic poles (3) are respectively arranged on two inner walls of the electromagnetic shielding films (2) facing each other;
    wherein the frame and spacers (4) are arranged between the two electromagnetic shielding films (2), and the frame and spacers (4) and the two electromagnetic shielding films (2) form a closed space;
    wherein the liquid medium (5) is distributed in the closed space;
    wherein the plurality of transparent magnetic particles (6) are arranged in the liquid medium (5) in the closed space;
    wherein a 3D display mode is realized when the plurality of transparent magnetic particles (6) are distributed in a curved shape, and a 2D display mode is realized when the plurality of transparent magnetic particles (6) are distributed in a same direction uniformly; and
    wherein the display screen (1) is fixed on an outer wall of either of the two electromagnetic shielding films (2).

2. The display device according to claim 1,
    wherein of the two electromagnetic shielding films (2), one electromagnetic shielding film (2) has a thickness ranging from 0.1 mm to 0.3 mm, and the other electromagnetic shielding film (2) has a thickness ranging from 0.1 mm to 0.3 mm; and
    wherein the two electromagnetic shielding films (2) both have a light transmittance higher than 95%.

3. The display device according to claim 1, wherein the transparent magnetic particles (6) have a ball shape, and a diameter of the ball is 100 nm.

4. The display device according to claim 1, wherein a height of the frame and spacers (4) is in a range from 15 µm to 25 µm, and the height refers to a span of the frame and spacers (4) in a direction perpendicular to the electromagnetic shielding films (2).

5. The display device according to claim 1, wherein the frame and spacers (4) and the two electromagnetic shielding films (2) form a plurality of closed spaces.

6. The display device according to claim 1, wherein the display screen (1) is an OLED display screen.

7. The display device according to claim 1, wherein the display screen (1) is a liquid crystal display screen.

8. A method for manufacturing a naked-eye 3D lens display device,
    wherein the naked-eye 3D lens display device comprises a display screen (1) and a 3D lens, characterized in that:
        the 3D lens comprises two electromagnetic shielding films (2), a plurality of electronically controlled magnetic poles (3), a frame and spacers (4), a liquid medium (5), and a plurality of transparent magnetic particles (6);
        the two electromagnetic shielding films (2) are arranged facing each other, and the plurality of electronically controlled magnetic poles (3) are respectively arranged on two inner walls of the electromagnetic shielding films (2) facing each other;
        the frame and spacers (4) are arranged between the two electromagnetic shielding films (2), and the frame and spacers (4) and the two electromagnetic shielding films (2) form a closed space;
        the liquid medium (5) is distributed in the closed space;
        the plurality of transparent magnetic particles (6) are arranged in the liquid medium (5) in the closed space;
        a 3D display mode is realized when the plurality of transparent magnetic particles (6) are distributed in a curved shape, and a 2D display mode is realized when the plurality of transparent magnetic particles (6) are distributed in a same direction uniformly; and
        the display screen (1) is fixed on an outer wall of either of the two electromagnetic shielding films (2); and
    wherein the method comprises steps of:
    step 1, forming a plurality of electronically controlled magnetic poles (3) on two electromagnetic shielding films (2) respectively;
    step 2, forming a frame and spacers (4) on one electromagnetic shielding film (2) containing the plurality of electronically controlled magnetic poles (3);
    step 3, pouring a liquid medium (5) containing a plurality of transparent magnetic particles (6) into a frame;
    step 4, assembling the frame and spacers (4) with the other electromagnetic shielding film (2) containing the plurality of electronically controlled magnetic poles (3), so that a 3D lens is manufactured; and
    step 5, assembling the 3D lens with a display screen (1).

* * * * *